United States Patent
Tardy

[11] 3,989,567
[45] Nov. 2, 1976

[54] CONNECTION METHOD FOR TWO OPTICAL FIBERS HAVING THE SAME DIAMETER

[75] Inventor: André Tardy, St Germain Les Arpajon, France

[73] Assignee: Compagnie Generale d'Electricite, Paris Cedex, France

[22] Filed: June 17, 1975

[21] Appl. No.: 587,773

[30] Foreign Application Priority Data
June 20, 1974   France ................ 74.21506

[52] U.S. Cl. ............... 156/158; 156/304; 350/96 R
[51] Int. Cl.² ............... B65H 69/06
[58] Field of Search ............ 156/49, 158, 304, 157; 350/96 R, 96 B, 96 C

[56] References Cited
UNITED STATES PATENTS

| | | | |
|---|---|---|---|
| 3,505,046 | 4/1970 | Phaneuf | 65/3 |
| 3,768,146 | 10/1973 | Braun et al. | 350/96 C |

*Primary Examiner*—William A. Powell
*Assistant Examiner*—M. G. Wityshyn
*Attorney, Agent, or Firm*—Sughrue, Rothwell, Mion, Zinn & Macpeak

[57] ABSTRACT

Method for producing a permanent link between two optical fibers, for example by welding or cementing, according to which the two fibers are previously aligned, arranging them in the channel formed between three parallel cylindrical steel rods clamped against each other.

6 Claims, 3 Drawing Figures

CONNECTION METHOD FOR TWO OPTICAL FIBERS HAVING THE SAME DIAMETER

This application relates to application Ser. No. 587,785 filed on June 17, 1975, entitled "Connector for an Optical Fibre Link" by Andre Tardy and assigned to the common assignee.

BACKGROUND OF THE INVENTION

1. Field Of The Invention

The invention concerns a connection method for two optical fibres having the same diameter with a view to forming a permanent optical link between these two fibres.

2. Description Of The Prior Art

The foreseeable development of telecommunications by guided optical waves makes it desirable to produce devices making it possible to connect together two optical fibres with coupling losses which are as low as possible, for example less than 1 db. If the fibres have, for example, a core with a diameter of 100 microns having a lower optical index, with a difference in index between core and casing comprised between $5.10^{-3}$ and $10^{-1}$, these devices must then allow the positioning of the fibres in the following conditions: distance between the ends facing the fibres less than 20 microns; relative excentricity less than 4 microns; relative inclination less than 1°. In the case where an adaptation of the index is effected, these tolerances become greater: 50 microns for the distance and 10 microns for the excentricity, the inclination being unchanged. Taking into account the slight diameter of the fibres, these tolerances are difficult to keep to.

The solutions proposed up to this day are very few and are generally related to laboratory installations.

The article by D. SCHICKETANZ, "Connectors for multimode fibres" (Siemens Forschung; Entwickl Ber. Bd 2 (1973) No. 4) proposes a connection between fibres through a glass capillary tube, which is swaged over given length with an inside diameter slightly greater than the outside diameter of the fibre. The capillary tube, having an index close to that of the casing of the fibre, contains either a liquid or a solid element, having an index close to that of the core of the fibre. The main characteristic is that the connector is itself an optical wave guide.

According to the article by C.G. Someda, "Simple, Low-loss joints between single-mode optical fibres" (Bell System Technical Journal Vol. 52 No. 4, April, 1973), the alignment between the optical fibres is effected by means of a groove obtained by swaging a methyl polymethacrylate sheet by means of a fibre having the same diameter.

According to French patent No. EN 73 11 188 applied for on 28th March, 1973, by WESTERN ELECTRIC COMPANY, INCORPORATED, for a "Device for connecting optical fibres", connecting is effected by deformation of a silicone elastomer web, which is drilled with a hole in which the fibres are engaged. Blocking is effected by pressure on two plates placed on either side of the web. The supposed result is the simultaneous alining and immobilizing of the fibres.

The article by Frank L. Thiel, Roy E. Love, Rex L. Smith, "In line connectors for multimode optical waveguide bundles" (Applied optics, Vol. 13, No. 2, February, 1974, page 240) proposes a connector structure between two cables each comprising a compact hexagonal stacking of the fibres in casing having a corresponding hexagonal inside cross-section. The aligning of the fibres results from the aligning of the casings of the two cables.

The aim of the present invention is to make it possible to ensure a permanent link between two optical fibres with a particularly great accuracy with respect to the aligning of these two fibres.

SUMMARY OF THE INVENTION

It has as its object a method for linking two optical fibres having the same diameter, according to which:

firstly, the aligning of the two fibres to be linked is effected, placing their ends at a short distance from each other;

a permanent and rigid link of these two ends is then formed; characterized in that, to form the said alignment, cylindrical rods which are rigid bodies of revolution and holding and clamping means for holding these rods parallel are used, whereby a central channel is formed between these rods, this channel being limited by the lateral surfaces of these rods facing each other, and the two optical fibres to be linked together are arranged in line in the said central channel, the ends of these two fibres being next to each other in that channel.

By means of the accompanying diagrammatic FIGS. 1 to 3 herewith, an embodiment of the invention having no limiting character will be described hereinbelow.

Corresponding elements in these figures are designated therein by the same reference symbols.

DESCRIPTION OF THE PREFERRED EMBODIMENT

Figure 1:
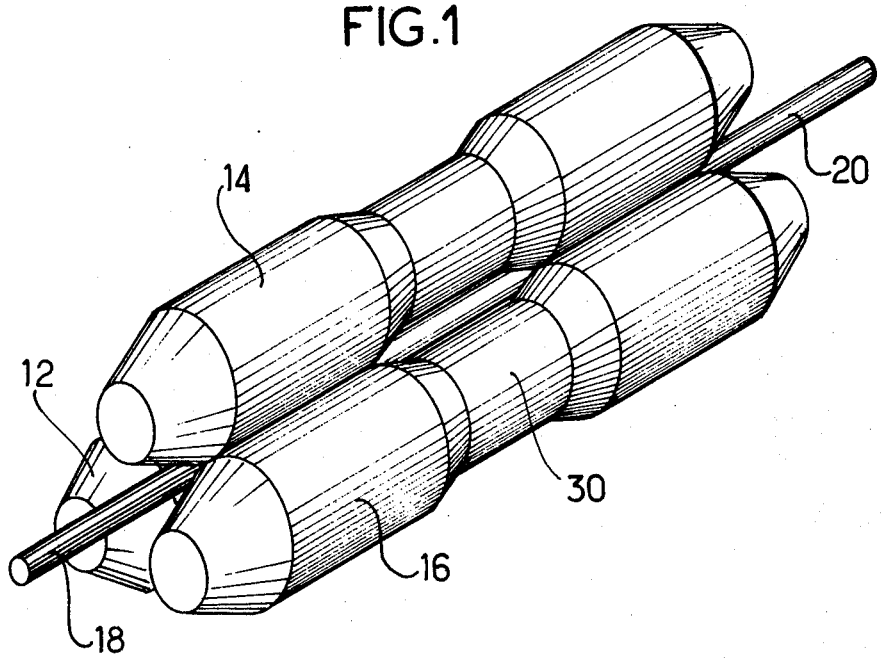
FIG. 1 is a perspective view of a device for implementing the method according to the invention.

The device shown in the figures comprises three rods in the shape of cylinders of revolution 12, 14 and 16, made of steel having a diameter of 646 microns and a length of a few centimetres. These three rods are parallel to one another and perpendicular to the plane of FIGS. 2 and 3 in which their axes 2, 4 and 6 appear at the three apexes of an equilateral triangle. Three circles representing the cross-sections of these rods through the plane of the sheet are each tangent to the two others. A central channel 10 is therefore formed between these three rods. It is limited by parts of the lateral surfaces of these three rods, these parts facing each other.

Two optical fibres 18 and 20 made of glass, having an outside diameter of 100 microns, in contact with the three rods 12, 14 and 16, are inserted in that channel. A thermoretractable sleeve 11 which can be seen in FIG. 3 holds the assembly together by surrounding the rods 12, 14 and 16 and by clamping them against one another and against the fibre 18. Other clamping means could obviously be used.

Because of the great accuracy conventionally obtained in the manufacturing of steel rods having a circular cross-section and because of the clamping of those rods against one another, the shape of the central channel 10 is defined with great accuracy. If the diameter of the fibre 18 has a suitable value, it results there-from that its position in relation to the rods 12, 14 and 16 is defined with great accuracy.

This has the advantage that when the central channel 10 is engaged by both the adjacent ends of two optical fibres 18 and 20, arranged in each other's extension, a particularly accurate alignment of these two fibre ends is produced.

In the example which has just been described, the accuracy of the positioning is due to the fact that each of the rods 12, 14 and 16 is in contact with the other two and with the fibres 18 and 20. This corresponds to a particular value of the ratio $k$ of the diameter D of the rods 12, 14 and 16 in relation to the diameter d of the fibres 18 and 20. That value is $k = D/d = 6.46$.

The ratio $k$ can, however, be raised to a value in the order of 7 without losing all the advantages of the invention. In that case, the three rods 12, 14 and 16 each remain in contact with the other two, but there exists a certain play between these rods and the fibres inserted in the central channel. That play is slightly detrimental to the accuracy and it can be necessary for facilitating the inserting of the fibres in the central channel 10.

The ratio $k$ can also be reduced. If it is reduced very slightly, there results only a flexible deforming of the fibre or of the rods. If it is greatly reduced, the three rods 12, 14 and 16 each remain in contact with the fibres inserted in the central channel, but the contact between two of the rods is necessarily lost. It is preferable for one of these three rods to remain in contact with the other two. On considering the triangle whose apexes are the points of intersection of the axes of the rods 12, 14 and 16 by a plane perpendicular to these axes, such as the plane of the sheet in FIGS. 2 and 3, it appears that the three angles of that triangle remain acute. If the ratio $k$ continues to decrease while one of the rods is held in contact with the other two over its whole length, there comes a time when the gap between these other two rods is large enough for the fibre to be able to escape laterally from the central channel. One of the angles of the previously defined triangle then becomes a right-angle and the ratio $k$ becomes equal to 2.41. It is therefore an advantage for the three angles of the previously defined triangle to remain acute and for the ratio $k$ to remain greater than 2.41.

The values of the ratio $k$ which have just been given can easily be calculated by a mathematician.

It ensues from what has previously been set forth and from the fact that the invention seems to afford an advantage for positioning fibres whose diameter is comprised between 10 and 500 microns, that the diameter of the rods 12, 14 and 16 is, to great advantage, comprised between 25 and 3.500 microns.

The ends of the rods 12, 14 and 16 can, to great advantage, be leveled in the shape of a cone to make the inserting of the fibres in the central channel easier.

Figure 2:
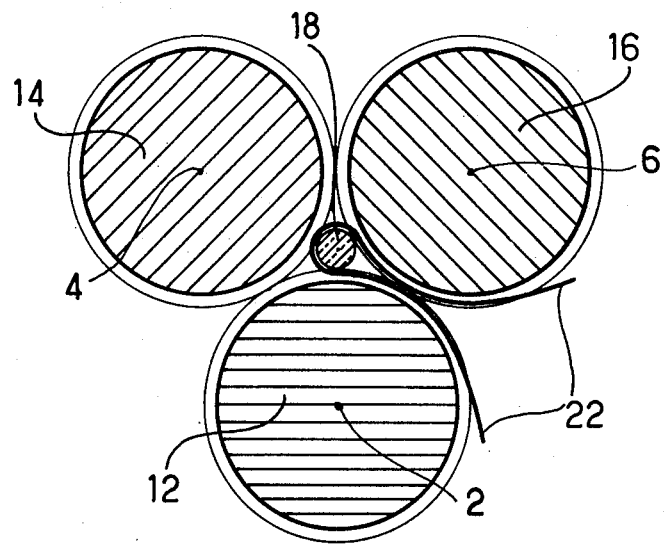
FIGS. 2 and 3 show cross-section view of the device in FIG. 1.
Figure 3:
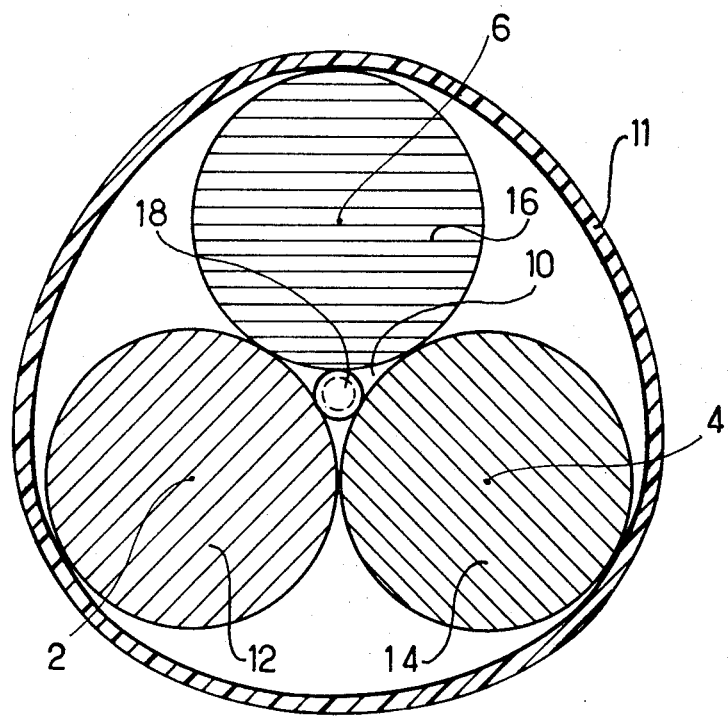

At a distance from the ends of the rods 12, 14 and 16, these latter are hollowed out so as to reduce their diameter over a common part 30 of their length. FIG. 2 shows a cross-section of that part having a reduced diameter. The ends of the fibres 18 and 20 are brought into the vicinity of each other in that part of length having a reduced diameter. The gaps thus formed between the rods 12, 14 and 16 and the space thus cleared round the ends of the fibres 18 and 20 make it possible to arrange means for effecting a permanent link between the ends of these fibres. These fibres can, for example, be brought into contact with each other by maintaining a longitudinal pressure on them, pass a tungsten wire 22 round these ends of the fibres and make an electric current suitable for giving out a sufficient heat for forming a weld of the ends of the fibres 18 and 20 pass through that wire.

Other means can, however, be used for forming the permanent and rigid link which is required. It is possible, for example, to insert a drop of transparent cement between the ends of the fibres 18 and 20, by means of a syringe whose needle passes through the gaps between the rods in their part having a reduced diameter. Of course, that cement must have a suitable optical index and good mechanical strength when it is dried or polymerized. Mechanical strengthening means such as a sleeve can then be arranged round the cementing or welding zone.

It is quite evident that several variants of the method according to the invention can be used. The diameters of the rods can, for example, be not all equal and the part of their length such as 30 in which the link between the fibres is formed can be hollowed out in various ways to make access to the ends of the fibres easier.

I claim:

1. In a method for axially linking two optical fibres having the same diameter, including the steps of:

firstly, aligning the two fibres to be linked, placing their ends at a short distance from each other;

and forming a permanent and rigid link between these two ends; the improvement wherein said aligning step comprises; placing said fibres between cylindrical rods which are rigid bodies of revolution and holding and clamping these rods parallel to each other to form a central channel between the rods with the channel being limited by the lateral surfaces of the rods facing each other and inserting the two optical fibres to be linked together in line within said central channel with the ends of these two fibres next to each other in that channel.

2. The method according to claim 1, wherein said rods are three in number and the diameters thereof are chosen such as each of these rods contacts the other two and the said fibres by its lateral surface without deforming these fibres.

3. The method according to claim 1, wherein the diameters of said rods are equal and are selected to be between 2.41 and 7 times the diameter of said fibres.

4. The method according to claim 2, wherein said holding and clamping step comprises surrounding said three rods with a sleeve which clamps them against each other.

5. The method according to claim 2, further comprising the step of hollowing out said rods on a part of the length of said channel at a distance from the ends of that channel, to provide access to said fibre ends to link said fiber ends together.

6. The method according to claim 2, further comprising the step of bevelling the rod ends so as to make the inserting of said fibres in said central channel easier.

* * * * *